(12) United States Patent
Roll et al.

(10) Patent No.: US 9,399,452 B2
(45) Date of Patent: Jul. 26, 2016

(54) METHOD FOR CONTROLLING AN ELECTROHYDRAULIC BRAKING SYSTEM AND ELECTROHYDRAULIC BRAKING SYSTEM

(75) Inventors: Georg Roll, Heusenstamm (DE); Jurgen Bohm, Oberneisen (DE); Jens Jager, Wiesbaden (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 198 days.

(21) Appl. No.: 13/810,727

(22) PCT Filed: Jul. 13, 2011

(86) PCT No.: PCT/EP2011/061929
§ 371 (c)(1),
(2), (4) Date: Jan. 17, 2013

(87) PCT Pub. No.: WO2012/010475
PCT Pub. Date: Jan. 26, 2012

(65) Prior Publication Data
US 2013/0119752 A1    May 16, 2013

(30) Foreign Application Priority Data

Jul. 23, 2010  (DE) .......................... 10 2010 038 325
Jun. 10, 2011  (DE) .......................... 10 2011 077 329

(51) Int. Cl.
*B60T 8/62*    (2006.01)
*B60T 8/176*   (2006.01)
(Continued)

(52) U.S. Cl.
CPC ................ *B60T 8/176* (2013.01); *B60T 8/326* (2013.01); *B60T 8/3655* (2013.01); *B60T 8/4054* (2013.01); *B60T 8/4072* (2013.01); *B60T 13/745* (2013.01)

(58) Field of Classification Search
CPC ....... B60T 8/326; B60T 8/3655; B60T 8/176; B60T 8/4072; B60T 13/745; B60T 8/4054
USPC ............... 303/3, 15, 113.1, 115.2, 119.1, 189
See application file for complete search history.

(56) References Cited

U.S. PATENT DOCUMENTS 5,758,930 A  *  6/1998  Schiel et al. ................ 303/113.4
5,836,659 A  *  11/1998  Feigel et al. ................ 303/115.2
(Continued)

FOREIGN PATENT DOCUMENTS

DE    31 31 856 A1    2/1983
DE    35 26 556 A1    1/1987
(Continued)

OTHER PUBLICATIONS

Search Report—Nov. 2, 1997.
(Continued)

*Primary Examiner* — Thomas J Williams
*Assistant Examiner* — Mariano Sy
(74) *Attorney, Agent, or Firm* — Brinks Gilson & Lione (57) ABSTRACT

A method and system is provided for controlling an electrohydraulic braking system for a motor vehicle having an antilock braking control function and an electrically controllable pressure generating device having a cylinder-piston arrangement having a hydraulic pressure chamber and a piston displaceable by an electromechanical actuator so that a predetermined pressure can be set in the chamber, and having a number of hydraulically wheel brakes connected to the hydraulic pressure chamber by an electrically actuatable inlet valve and to a pressure medium reservoir via an electrically actuatable outlet valve. The cylinder-piston arrangement is actuated in case of antilock controlling at all wheel brakes for setting an individual wheel target pressure at each wheel brake, such that the pressure in the hydraulic pressure chamber is set to the greatest wheel target pressure.

15 Claims, 2 Drawing Sheets

(51) Int. Cl.
*B60T 8/32* (2006.01)
*B60T 8/36* (2006.01)
*B60T 8/40* (2006.01)
*B60T 13/74* (2006.01)

(56) References Cited

U.S. PATENT DOCUMENTS

| | | | |
|---|---|---|---|
| 6,007,161 A * | 12/1999 | Worsdorfer | 303/115.2 |
| 6,033,036 A * | 3/2000 | Ruffer et al. | 303/114.1 |
| 6,315,370 B1 * | 11/2001 | Feigel et al. | 303/115.2 |
| 7,004,551 B2 * | 2/2006 | Yokoyama et al. | 303/115.2 |
| 7,063,393 B2 * | 6/2006 | Suzuki et al. | 303/115.2 |
| 8,523,294 B2 * | 9/2013 | Klimes et al. | 303/115.2 |
| 8,579,386 B2 * | 11/2013 | Hatano | 303/116.2 |
| 8,788,172 B2 * | 7/2014 | Bohm et al. | 701/78 |
| 2008/0120004 A1 * | 5/2008 | Nakada et al. | 701/70 |
| 2009/0037065 A1 * | 2/2009 | Burkhard et al. | 701/71 |

FOREIGN PATENT DOCUMENTS

| | | |
|---|---|---|
| DE | 39 26 244 A1 | 2/1991 |
| DE | 196 26 926 A1 | 1/1998 |
| DE | 10 2011 076 675 A1 | 12/2011 |
| EP | 0 420 484 A1 | 3/1991 |
| EP | WO 97/13672 | 4/1997 |
| EP | WO 97/14593 | 4/1997 |
| EP | WO 2011/029812 A1 | 3/2011 |

OTHER PUBLICATIONS

PCT International Search Report—Oct. 19, 2011.

* cited by examiner

METHOD FOR CONTROLLING AN ELECTROHYDRAULIC BRAKING SYSTEM AND ELECTROHYDRAULIC BRAKING SYSTEM

CROSS REFERENCE TO RELATED APPLICATIONS

This application claims priority to German Patent Application Nos. 10201003825.2, filed Jul. 23, 2010, 102011077329.0, filed Jun. 10, 2011, and PCT/EP2011/061929, filed Jul. 13, 2011.

FIELD OF THE INVENTION

The invention relates to a method for controlling an electrohydraulic braking system for motor vehicles in and an electrohydraulic braking system.

BACKGROUND AND SUMMARY OF THE INVENTION

"Brake-by-wire" braking systems are being used ever more frequently in automotive technology. Braking systems of this type frequently comprise in addition to a master brake cylinder that can be actuated by the vehicle driver, an electrically controllable pressure generating device by means of which in the operating mode "brake-by-wire" the wheel brakes or the master brake cylinder are actuated. In order to provide the vehicle driver with a pleasant pedal sensation in the "brake-by-wire" operating mode, the braking systems generally comprise a brake pedal sensation simulation device. In the case of these braking systems, the wheel brakes can also be actuated in response to electronic signals without any active input by the vehicle driver. These electronic signals can be emitted for example by an electronic stability program or by a proximity control system.

A "brake-by-wire" braking system is known from the international patent application WO 2011/029812 A1 having a pressure generating device comprising a hydraulic cylinder-piston arrangement, the piston of which can be actuated by an electric motor whilst inter-positioning a rotation-translation gear. The pressure generating device is connected hydraulically to a pressure modulation unit that comprises for each wheel brake an inlet valve and an outlet valve. The braking system comprises a pressure sensor for measuring the pressure (braking system pressure, pre-pressure) of the pressure generating device. The previously referenced application does not contain any more detailed explanations as regards how to set or reset a predetermined desired value for the pressure of the pressure generating device.

The unpublished document DE 10 2011 076 675 discloses a method for controlling an electrohydraulic braking system having an electrically controllable pressure generating device that comprises a cylinder-piston arrangement, the piston of which can be actuated by means of an electromechanical actuator. In order to set a suitable pressure in the cylinder-piston arrangement, in the case of an antilock braking control operation the pressure is always set higher by a safety margin $\Delta P$ than the desired wheel braking pressure at the wheel brake having the highest pressure requirement. As a consequence, it is achieved that all wheels being subjected to an antilock braking control operation are sufficiently charged so that it is possible to perform a pressure increase procedure at each wheel by opening the associated inlet valve. In order to maintain a constant pressure at a wheel, the inlet valve is actively closed, whereas the outlet valve remains closed. During a pressure reduction procedure, the inlet valve is closed, whereas by opening the outlet valve for a short period of time pressure medium is discharged from the wheel brake.

The control method described in DE 10 2011 076 675 has the principle disadvantage that it is difficult to set the pressure in the pressure chamber of the piston-cylinder arrangement with a high level of accuracy since in the by far longest time periods of the control operation all inlet valves are closed and consequently the pressure chamber are separated from the relatively elastic wheel brakes. In order to be able to modulate the pressure in a rapid and reproducible manner, the pressure chamber itself is not to have any noticeable elasticity. However, from the point of view of control technology, this boundary condition represents a problem, since even an extremely small modulation of the piston travel causes the pressure in the rigid pressure chamber to fluctuate by amounts that are not insignificant. In addition to the problems associated with control technology, the above described control operation also produces particular noise problems. The higher the pressure differential across the inlet valves, the greater are the switching noises if a valve is switched to through-flow. The constant switching on and off of the wheel brakes by opening and closing the inlet valves therefore has a permanent adverse effect when controlling the pressure in the pressure chamber and disturbing noises occur.

It is therefore the object of the present invention to provide an electrohydraulic braking system having an electrically controllable pressure generating device that comprises a cylinder-piston arrangement, the piston of which can be actuated by means of an electromechanical actuator, and a method for controlling said braking system, which method allows a low-noise antilock braking control operation to be performed. In addition, a high quality control operation is to be achieved.

This object is achieved in accordance with the invention by means of a method in accordance with claim 1 and a braking system in accordance with claim 14.

The invention is based on the idea, when performing an antilock braking control operation on the wheel brakes that are connected to the hydraulic pressure chamber of the pressure generating device, of setting as the pressure in the hydraulic pressure chamber precisely that pressure required by the wheel brake having the highest to-be-set wheel desired pressure.

Preferably, the pressure in the hydraulic pressure chamber during the antilock braking control operation always corresponds to the respective highest wheel desired pressure of the wheel brakes.

In accordance with a further development of the invention, during the antilock braking control operation always at least one wheel brake having the highest wheel desired pressure in terms of full pressure compensation between the wheel brake and the pressure chamber is connected to the hydraulic pressure chamber.

It is preferred during the antilock braking control operation that the inlet valve of a single wheel brake having the highest desired wheel pressure is open so that the pressure in the hydraulic pressure chamber is equal to the wheel braking pressure of this wheel brake.

In the case that the same highest wheel desired pressure or approximately the highest wheel desired pressure is to be set at two or more wheel brakes, preferably the inlet valves of all these wheel brakes are open during the antilock braking control operation.

The invention provides the advantage that the pressure chamber during the antilock braking control operation is connected to at least one relatively elastic wheel brake. As a consequence, the pressure control operation is simplified as far as the control technology is concerned. In addition, a switching of the inlet valve of the wheel brake that is connected to the pressure chamber is avoided and the switching noises of the other inlet valves are reduced on the basis of the lower pressure differential across the inlet valves.

The pressure generating device comprises essentially a hydraulic cylinder-piston arrangement and an electromechanical actuator that is preferably embodied by an electric motor having a reduction gearing.

The electromechanical actuator is preferably embodied in a manner such that it is able to reverse and ensures a translation movement of a hydraulic piston of the cylinder-piston arrangement, so that a hydraulic pressure can be increased and reduced in a pressure chamber of the hydraulic cylinder-piston arrangement. A rotation position sensor is advantageously used to sense the rotation position and the travel distance of the electromechanical actuator.

Preferably, pressure increase procedures and/or pressure reduction procedures are to be performed on the wheel brake having the highest wheel desired pressure or on the wheel brakes having the highest or almost highest wheel desired pressure are performed exclusively by means of displacing the piston of the cylinder-piston arrangement as long as the wheel desired pressure of the wheel brake (n) is the highest wheel desired pressure. As a consequence, the switching of the inlet and outlet valves for the pressure modulation operation and consequently switching noises are avoided.

In accordance with a preferred embodiment of the method in accordance with the invention, each wheel brake whose wheel desired pressure does not correspond to the highest wheel desired pressure is separated by a closed inlet valve from the hydraulic pressure chamber.

It is further preferred that the inlet valve of the wheel brake whose wheel desired pressure does not correspond to the highest wheel desired pressure is opened for a short period of time in the case that pressure is to be increased at the wheel brake and that the outlet valve of the wheel brake whose wheel desired pressure does not correspond to the highest wheel desired pressure is opened in the case that pressure is to be reduced at the wheel brake.

The wheel desired pressure for a wheel brake is preferably equal to an ABS pressure request that is determined by means of the antilock braking control function if the ABS pressure request is smaller than a braking pressure that is requested by a vehicle driver. On the other hand, the wheel desired pressure for a wheel brake is preferably equal to the braking pressure requested by the vehicle driver if the braking pressure requested by the vehicle driver is smaller than the ABS pressure request. As a consequence, the wheel desired pressure is limited to the braking pressure requested by the vehicle driver, e.g. if the driver abandons the brake pedal during the antilock braking control operation.

The ABS pressure request that is determined by means of the antilock braking control function is advantageously equal to a predetermined maximum pressure value if the wheel is not being subjected to an antilock braking control operation or the antilock braking control operation does not have priority at this wheel.

In accordance with a further development of the invention, the inlet valves are embodied as analog inlet valves or as inlet valves that operate in an analog manner.

Preferably, a pressure increase procedure in a wheel brake whose wheel desired pressure does not correspond to the highest wheel desired pressure is performed by means of digitally controlling the associated inlet valves if the pressure differential between the pressure in the hydraulic pressure chamber and the actual wheel desired pressure is smaller than a predetermined threshold value.

It is likewise preferred that the hydraulic pressure chamber and/or the hydraulic pressure chambers of the cylinder-piston arrangement is/are connected by means of at least one valve, advantageously a non-return valve, to the pressure medium storage container, so that by means of drawing back the piston of the cylinder-piston arrangement pressure medium can be drawn from the pressure medium storage container into the pressure chamber/pressure chambers.

Advantageously, the method in accordance with the invention is performed in a braking system for motor vehicles, which braking system can be controlled in a so-called "brake-by-wire" operating mode both by the vehicle driver and also independently from the vehicle driver, which braking system is preferably operated in the "brake-by-wire" operating mode and can be operated in at least one fallback operating mode in which only the operation by means of the vehicle driver is possible.

In accordance with a further development of the invention, the inlet valve of the wheel brake (n) having the respective highest desired pressure value is continuously open and the outlet valve of the wheel brake (n) having the respective highest desired pressure value is continuously closed, wherein advantageously the inlet valves are embodied as de-energized open valves and the outlet valves are embodied as de-energized closed valves.

BRIEF DESCRIPTION OF THE DRAWINGS

Further preferred embodiments of the invention are evident from the subordinate claims and the description herein with reference to the figures in which schematically:

DETAILED DESCRIPTION OF THE INVENTION

Figure 1:
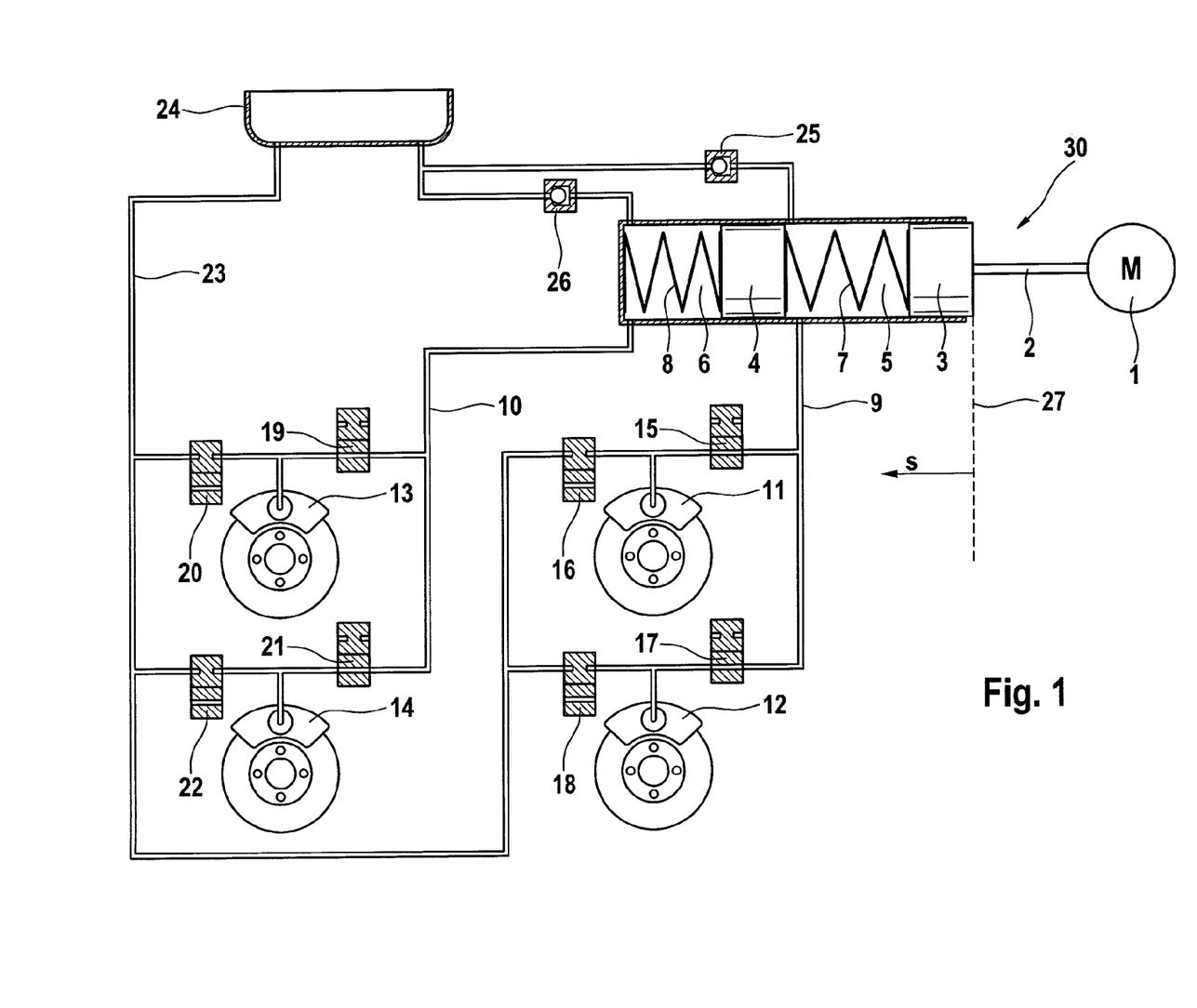
FIG. 1 shows a circuit diagram of an electrohydraulic braking system for performing a method in accordance with the invention and FIG. 2 shows time progressions of method-relevant variables.

FIG. 1 illustrates the simplified principle of an active electrohydraulic braking system having in accordance with the example, four antilock braking controllable wheel brakes, which is suitable for performing a method in accordance with the invention. In the case of the braking system, the driver submits, e.g. by means of a brake pedal movement, a braking pressure request $P_{Request\_Driver}$ that is implemented electronically with the aid of a pressure generating device 30. The pressure generating device 30 comprises in accordance with the example an electric motor 1, suitable gearing 2 and a cylinder-piston arrangement that comprises a piston 3, a floating piston 4 and two hydraulic pressure chambers 5 and 6. The piston 3 can be displaced in the cylinder by means of the electric motor that is embodied in a manner such that it can reverse. Two wheel brakes 11, 12, 13, 14 are connected to each of the two pressure chambers 5, 6 by means of in each case an electrically controllable, de-energized open inlet valve 15, 17, 19, 21. Each wheel brake 11, 12, 13, 14 can be connected by means of an electrically controllable, de-energized closed outlet valve 16, 18, 20, 22 and line 23 to a pressure medium storage container 24 that is subject to atmospheric pressure.

In order to implement the braking pressure request, the piston 3 is displaced by a distance s from its idle position 27 towards the left (As the components are shown in FIG. 1), so that a particular volume of pressure medium is displaced out of the pressure chamber 5 by means of the line 9 and the initially open inlet valves 15, 17 into the wheel brakes 11, 12 of two wheels, e.g. front wheels. A similar procedure occurs accordingly, with the aid of the floating piston 4 that is displaced likewise towards the left by means of the pressure in the pressure chamber 5 and consequently displaces pressure medium out of the pressure chamber 6 by means of the line 10 and the likewise initially open inlet valves 19, 21 into the wheel brakes 13, 14 of two further wheels e.g. rear wheels. Consequently, a uniform braking pressure according to the driver request $P_{Request\_Driver}$ is generated in the wheel brakes 11, 12, 13 and 14. The cylinder-piston arrangement 3, 4, 5, 6 that can be actuated by means of the electromechanical actuator assembly including electric motor 1, gearing 2 restoring springs 7, 8 by means of which the pistons 3, 4 are returned to defined positions in the non-braked case. In comparison to the conventionally applied pressures in the pressure chambers 5, 6, the restoring springs 7, 8 are embodied in such a weak manner that they have practically no influence on the pressure conditions in the pressure chambers 5, 6.

A reduction in braking pressure can occur simultaneously at all wheel brakes 11, 12, 13 and 14 in that the piston 3 is displaced back in the direction towards the idle position 27. It is also possible by means of the combination of inlet valve and outlet valve (15, 16, 17, 18, 19, 20, 21, and 22), said combination being allocated to the respective wheel brake 11, 12, 13, and 14, for a reduction in braking pressure to occur rapidly and individually per wheel at a particular wheel brake as is required in the case of a particular wheel being subjected to an antilock braking control operation (ABS control operation), in that the inlet valve is closed and the outlet valve is open for a particular period of time. Pressure medium then flows from the wheel brake through the respective outlet valve and consequently by means of the line 23 into the pressure medium storage container 24. This procedure for reducing pressure is then also expedient if the pressure chambers 5, 6 supply a plurality of wheel brakes in parallel with individual (different) wheel braking pressures.

The pressure chambers 5, 6 of the cylinder-piston arrangement are in accordance with the example in each case connected by means of a hydraulic connecting line to a non-return (check) valve 25, 26 to the pressure medium storage container 24, so that as the piston 3 moves back and in the case of closed inlet valves, pressure medium can be drawn from the pressure medium storage container 24 into the pressure chambers 5, 6.

Numerous improvements and different variants of the principle with respect to the simplified illustration of the system in FIG. 1 are feasible, e.g. when selecting the valves. The pressure generating device 30 can also comprise a cylinder-piston arrangement having only one hydraulic pressure chamber, the piston of which can be displaced by means of the electromechanical actuator, so that all the wheel brakes are connected to the same hydraulic pressure chamber.

The concept of the control operation that is described in this case describes, for example, the setting of suitable pressure progressions in a pressure chamber 5, 6 of a pressure generating device 30 of an active braking system in the case of all the wheels being subjected to a running antilock braking control operation (ABS control operation).

In accordance with the example, the pressure that is set in the pressure chambers 5 and 6 of the pressure generating device 30 is always precisely the same pressure that is to be set at the wheel brake having the highest pressure request. If, for example, the highest wheel braking pressure is to be set at the wheel brake 11, then the wheel brake 11 is supplied with the corresponding pressure progression directly by means of the plunger piston 3 and/or 4 with respect to the required ABS pressure modulation operation. In so doing, the corresponding inlet valve 15 remains permanently open and the pressure in the wheel brake 11 is varied by virtue of the fact that the piston 3 is moved forwards and backwards in such a manner that the pressure that is set in the pressure chamber 5 is precisely the pressure that is requested by the antilock braking control function for the wheel brake 11. The corresponding individual wheel braking pressure for each wheel is set with the aid of the inlet valves 17, 19, 21 and the allocated outlet valves 18, 20, 22 at the other three wheel brakes 12, 13, 14, for which the antilock braking control function requests lower pressure levels (wheel braking pressures).

If at a particular point in time the requested wheel braking pressure of the initially directly controlled wheel brake 11 falls below the requested wheel braking pressure of another wheel brake (for example below the level of wheel brake 12), then in accordance with the example a change of the directly controlled wheel occurs in that now the wheel brake 12 is supplied directly by means of the pressure chamber 5 having a continuously open inlet valve 17, whereas the pressure in the wheel brake 11 is set by means of the inlet valve 15 operating in a cyclic manner (opening and closing).

Consequently, in accordance with the example the pressure level of the wheel brake having the highest pressure requirement is always present in the pressure chambers 5 and 6.

An advantage of the above described control method resides in the fact that one of the pressure chambers 5, 6 is directly hydraulically connected at each point in time to one of the wheel brakes 11, 12, 13 or 14. This connection to a "hydraulically soft consumer" results in the fact that the pressure in the pressure chambers 5 and 6 can be set easily by means of the electric motor 1 and the gearing 2 since a small piston travel change $\Delta s$ also only effects small pressure change. Consequently, on the one hand it is easier using control technology to set the wheel braking pressures, on the other hand the noise behavior of the braking system is considerably improved, since the otherwise severe fluctuations in pressure in the pressure chambers 5 and 6 in conjunction with switching the wheel braking circuit on and off cause considerable noise.

If the driver actuates the brake pedal and submits in this manner a driver request pressure $P_{Request\_Driver}$, then the pressure $P_{Pre\_Pressure}$ in the pressure chambers 5, 6 is set to the maximum of the pressure requests $P_{Request\_i}$ of all n wheel brakes (i=1, 2, ..., n), wherein $P_{Request\_i}$ of the wheel desired pressure (the wheel braking pressure requested at the wheel brake i) for the i-th wheel is:

$$P_{Pre\_Pressure} = \text{Maximum}(P_{Request\_1}, \ldots, P_{Request\_n})$$

The wheel desired pressure $P_{Request\_i}$ for the i-th wheel is derived from the driver request pressure $P_{Request\_Driver}$ (requested by means of the brake pedal travel) and the ABS pressure request determined for the wheel brake i by means of the antilock braking control function $P_{ABS\_act\_i}$, in accordance with:

$$P_{Request\_i} = \text{Minimum}(P_{ABS\_act\_i}, P_{Request\_Driver}),$$

i.e. the pressure request $P_{Request\_i}$ corresponds to the smaller value of the driver request pressure $P_{Request\_Driver}$ and ABS pressure request $P_{ABS\_act\_i}$, so that the wheel desired pressure $P_{Request\_i}$ that is to be set cannot exceed the driver request pressure. This limitation can be performed, for example, in the ABS control routine, so that the wheel desired pressure $P_{Request\_i}$ is submitted P by the ABS control function. If the wheel brake i is being subjected to the ABS control operation and the ABS control operation has priority over other control functions (e.g. an electronic stability program or a proximity control system) then the ABS pressure request $P_{ABS\_act\_i}$ corresponds to a braking pressure progression having phases where the pressure is increased and reduced by the locking pressure level of the i-th wheel. If the antilock braking control operation at the i-th wheel does not have any control operation priority or if there is no active ABS control operation, then the ABS pressure request $P_{ABS\_act\_i}$ corresponds to a maximum pressure $P_{Max}$ (e.g. 200 bar).

If the driver requests a higher braking pressure $P_{Request\_Driver}$ during a brake application, then this higher braking pressure is only then allowed in accordance with the above equations and is effective as the pressure $P_{Pre\_Pressure}$ if at least one of the four wheels is still running in a stable manner without being subjected to an ABS control operation, in other words does not tend to lock up on the basis of the driver braking pressure.

For a wheel i that is not yet being subjected to an ABS control operation, the ABS pressure request $P_{ABS\_act\_i}$ is set to a maximum system pressure of e.g. 200 bar, so that the driver braking pressure $P_{Request\_Driver}$ then dominates the minimum function.

If all n wheels (e.g. for passenger cars n=4) are subjected to an ABS control operation, the pressure $P_{Pre\_Pressure}$ is reduced beyond the maximum function to the level of the wheel brake having the highest pressure request, even if this level is below the braking pressure requested by the driver $P_{Request\_Driver}$.

As an alternative but with the same result, the pressure $P_{Pre\_Pressure}$ in the pressure chambers 5, 6 can also be calculated in accordance with the formula:

$$P_{Pre\_Pressure}=\text{Minimum}(\text{Maximum}(P_{ABS\_act\_1},\ldots,P_{ABS\_act\_n}),P_{Request\_Driver}).$$

Figure 2:
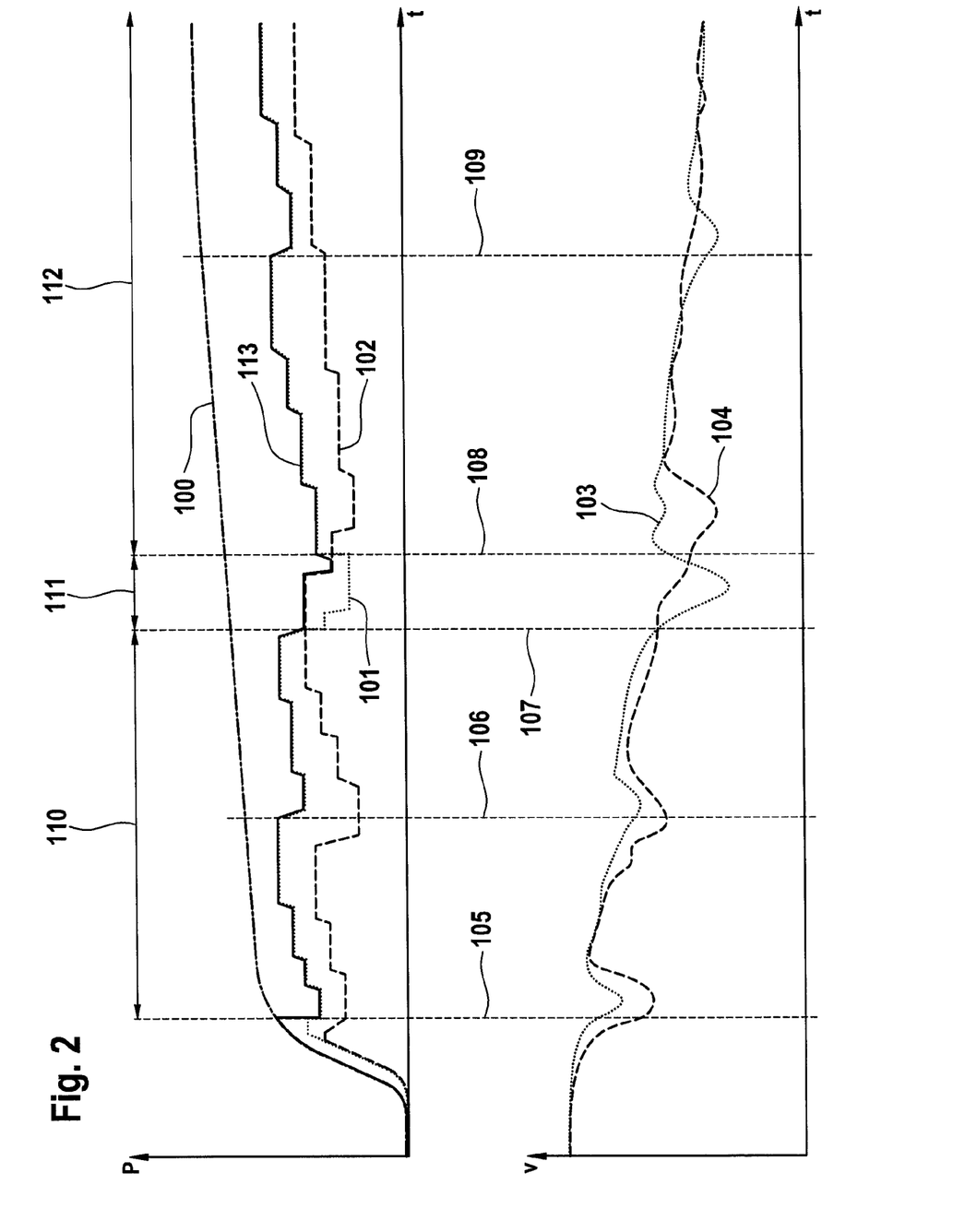

FIG. 2 illustrates time progressions of method-relevant variables during an ABS control operation. Exemplary embodiments of a method in accordance with the invention are explained with reference to the exemplary time diagrams. In order to represent the progressions as clearly as possible, only two wheels that are being subjected to an ABS control operation are considered in accordance with the example. However, the principles explained can be applied to any number of wheel braking circuits or wheels connected to the system, e.g. also to four wheels of a motor vehicle.

The upper diagram in FIG. 2 illustrates the braking pressure request $P_{Request\_Driver}$ submitted by the driver as a time progression 100. The lower diagram in FIG. 2 represents wheel speed. In the example, the driver has with his braking pressure request 100 excessively braked the two wheels under consideration, which at the wheel speeds 103 (e.g. left front wheel, i=1, e.g. wheel brake 11 in FIG. 1) and 104 (e.g. right front wheel, i=2, e.g. wheel brake 12 in FIG. 1) is clearly evident in the lower diagram on the basis of the severe braking slip occurrences. The antilock braking control function then sets the reduced wheel braking pressures 101 (left front wheel, $P_{Request\_1}$) and 102 (right front wheel, $P_{Request\_2}$). At the point in time 105 all wheels are subjected for the first time to the ABS control operation, so that the pressure 113 ($P_{Pre\_Pressure}$) in the pressure chambers 5, 6, which up to the point in time 105 responded to the driver braking request 100, is reduced to the wheel having the highest ABS pressure request (the highest wheel desired pressure $P_{Request\_i}$), i.e. to the signal 101. For the sake of clarity, the pressure progression 113 is plotted somewhat offset upwards with respect to the wheel braking pressure signals 101 and 102 in order to avoid covering said signals, as plotted.

In the time interval 110, the wheel braking pressure 101 of the left front wheel is always above the wheel braking pressure 102 of the right front wheel, so that during this time period the left wheel is the "leading wheel" with respect to the pressure setting in the pressure chamber 5, 6. This means that the pressure 113 is set exactly to this pressure value. The pressure 113 is modulated by means of the electromechanical actuator 30 and the plunger piston 3 in a precise manner so that the left front wheel (wheel brake 11 in FIG. 1) is influenced with the corresponding braking pressure $P_{Request\_1}$ without its inlet and outlet valves 15, 16 being activated.

At the point in time 106 the required pressure reduction in the wheel brake 11 (progression 101) is likewise achieved directly by means of the plunger piston 3, in that said plunger piston is moved backwards by a small amount of travel distance Δs (towards the right in FIG. 1).

The wheel braking pressure progression 102 is set at the right front wheel brake 12 in that the wheel brake is separated to a great extent from the pressure chamber 5 by closing the associated inlet valve 17 and is supplied with some pressure medium only in the short phases where pressure is increased in each case by opening the inlet valve 17. In the case of a required pressure reduction in the braking circuit for wheel brake 12, the inlet valve 17 is closed and the outlet valve 18 is opened for a short time, so that some pressure medium can discharge from the wheel braking circuit 12 into the storage container 24. The wheel having the smaller pressure request is therefore controlled by means of the allocated inlet/outlet valve pair.

As illustrated in FIG. 2, the pressure 113 that is set in this manner in the pressure chambers 5, 6 is clearly below the driver pressure request 100, which results in reduced energy consumption and less noise development.

Owing to the relatively small pressure differential between the pressure 113 and the wheel braking pressure 102 it is advantageous in the case of a necessary pressure increase in the wheel brake 12 where appropriate to digitally control the inlet valve 17 in order to ensure that the valve is reliably open for a short period of time and that there is sufficient volume through-flow even if the valve 17 is an analog valve or a switching valve that operates in an analog manner, which in order to achieve a small through-flow usually over a longer period of time is provided with an analog (average) flow value.

It is then only expedient in accordance with the example to operate the inlet valve in an analog manner if the pressure differential between the pressure 113 and the wheel pressure 102 is greater than a particular threshold, by way of example 40 bar. In this case, the analog operation can be advantageous for reasons relating to noise technology.

In order to set the desired pressure progression 102 as precisely as possible, it can also be advantageous to operate the inlet valve 17 in a mixed digital and analog operation, wherein the valve is fully opened by means of a short digital control operation and then is partially closed in the following time period in the analog mode.

The "leading wheel" changes with respect to the pressure setting at the point in time 107 since on the basis of a severe braking slip occurrence (cf. speed 103) the left front wheel requires a severe pressure reduction that allows the wheel braking pressure 101 to fall below the wheel braking pressure level 102 of the right front wheel. The pressure 101 only exceeds the pressure 102 again at the point in time 108 so that during the time interval 111 the right front wheel is leading with the higher pressure level 102, i.e. determines the pressure 113.

A leading wheel change of this type effects a switching over of the pressure chamber 5 from one wheel brake to another wheel brake that on the basis of the rapid manner in which the inlet valves are switched over (at the point in time 108 the inlet valve 15 is closed and the inlet valve 17 is fully opened) causes a pressure surge in the pressure chamber 5. Owing to the rigidity of the pressure chamber 5, the pressure compensation at the "new" wheel occurs extremely rapidly since a comparatively small compensation volume flow of the switched-in wheel (having a "soft" wheel braking circuit) causes an immediate pressure change in the pressure chamber 5.

On the basis of the rapid pressure adjustment in the pressure chambers 5, 6 to the respective switched-in wheel brake even a frequent and rapid switching of the leading wheel does not cause any loss in braking performance.

The pressure is reduced at the point in time 107 in the wheel brake 11 in accordance with the example by means of the outlet valve 16 (and not by means of the plunger piston 3 moving backwards) since the pressure chamber 5 is connected directly at the point in time 107 to the "new" wheel circuit 12.

In contrast thereto, the pressure in the wheel brake 11 is reduced at the point in time 109 in accordance with the invention using again the plunger piston 3 since the wheel brake 11 is the leading wheel during the entire time interval 112 since the pressure level of said wheel (progression 101) always remains above the pressure 102 of the circuit 12.

In accordance with another exemplary embodiment of the method in accordance with the invention, two or even more wheels are connected simultaneously during a particular time interval to the pressure chambers 5, 6 if these wheels all have the same or almost the same pressure request $P_{Request\_i}$. This can occur in particular in the case of the two rear wheels of a motor vehicle since these are mostly controlled in accordance with the so-called select-low principle, i.e. both rear wheels are to receive precisely the same wheel desired pressure that is required by the rear wheel that has the respective more severe tendency to lock.

In accordance with the example, the method used for controlling an active hydraulic braking system is a method that comprises a pressure generating device having a piston that is driven by an electric motor and generates in a pressure chamber of a cylinder a central pressure for wheel brakes of a motor vehicle, an inlet valve for each wheel brake by means of which inlet valve the wheel brake can be hydraulically separated from the pressure chamber, an outlet valve for each wheel brake by means of which, for the purpose of reducing pressure, pressure medium can be discharged from the wheel brake into a pressure medium storage container, and a valve-controlled, hydraulic connecting line between the pressure medium storage container and the cylinder of the piston.

In the case of all the wheel brakes being subjected to an ABS control operation, the pressure in the pressure generating device, for example, is set according to the pressure progression that the wheel brake that has the highest pressure request requires (leading wheel brake), wherein the inlet valve and the outlet valve of this wheel brake are maintained in an open and/or closed state (advantageously the de-energized state/neutral state), so that the pressure of the pressure chamber of the pressure generating device is set in the wheel brake.

Advantageously, in the respective open wheel braking circuit (of the leading wheel brake) all the pressure increase procedures and pressure reduction procedures required by the antilock braking control operation are performed exclusively by means of displacing the piston, i.e. by varying the pressure in the pressure generating device. This applies as long as the pressure of the open wheel braking circuit remains above the current pressure level of all the other wheels that are being subjected to an ABS control operation even in the case of a pressure reduction.

In accordance with another exemplary embodiment, a plurality of wheel braking circuits are also connected simultaneously to the pressure chamber if said wheel braking circuits have identical or almost identical pressure requests. This occurs advantageously in the case of a select-low control operation being performed on the rear wheels of a motor vehicle.

In accordance with the example, all wheels/wheel brakes having a comparatively lower pressure level than the wheel that is directly controlled with the pressure of the pressure generating device (non-leading wheel brakes) are hydraulically separated with the aid of their allocated inlet valve from the pressure chamber and said wheels/wheel brakes are only intermittently connected to the pressure chamber by means of opening the inlet valve if a pressure increase procedure is required in each case. A required pressure reduction procedure at a non-leading wheel brake is performed with the aid of the outlet valve that is allocated to the wheel brake.

A pressure increase procedure at a non-leading wheel brake is advantageously also performed in the case of analogue inlet valves or inlet valves that operate in an analog manner intermittently or constantly by means of controlling the inlet valve in a digital manner, in particular if the pressure difference between the pressure chamber and the wheel brake is low, i.e. below a defined threshold.

While the above description constitutes the preferred embodiment of the present invention, it will be appreciated that the invention is susceptible to modification, variation and change without departing from the proper scope and fair meaning of the accompanying claims.

The invention claimed is:

1. A method for controlling an electrohydraulic braking system for motor vehicles of the type having an antilock braking control function (ABS) and an electrically controllable pressure generating device in the form of a cylinder-piston arrangement having at least one hydraulic pressure chamber, and a piston which can be being displaced by means of an electromechanical actuator, so that a predetermined pressure ($P_{Pre\_Pressure}$) can be set in the hydraulic pressure chamber, and having a plurality of hydraulically actuatable wheel brakes, in which each of the wheel brakes are connected by means of an electrically actuatable inlet valve to the hydraulic pressure chamber and by means of an electrically actuatable outlet valve to a pressure medium storage container comprising the steps of in the case of the wheel brakes being subjected to an antilock braking control operation, controlling the cylinder-piston arrangement for setting an individual wheel desired pressure ($P_{Request\_i}$) for each wheel brake, wherein the individual wheel desired pressures for each of the wheel brakes comprises a highest wheel desired pressure and at least one reduced wheel desire pressure, wherein the individual wheel desired pressures for each of the wheel brakes is set in such a way that the predetermined pressure ($P_{Pre\_Pressure}$) in the hydraulic pressure chamber is set to the highest wheel desired pressure ($P_{Request\_i}$) of the wheel brakes, wherein at least one of the wheel brakes has a desired pressure corresponding to the highest wheel desired pressure and the pressure in the wheel brake having the highest wheel desired pressure is set by fully opening the corresponding inlet valve and fully closing the corresponding outlet valve and by controlling the cylinder-piston arrangement such that the pressure in the wheel brake having the highest wheel desired pressure is exclusively controlled by the cylinder-piston arrangement, wherein the pressure in at least one of the wheel brakes having the reduced wheel desired pressure is set by actuating the corresponding inlet valve and outlet valve to reduce the corresponding pressure;

wherein the pressure in the wheel brake having the highest wheel desired pressure is exclusively controlled by the cylinder-piston arrangement by displacing the piston in a first direction to increase the pressure in the wheel brake having the highest wheel desired pressure and displacing the piston in a second direction opposite the first direction to decrease the pressure in the wheel brake having the highest wheel desired pressure; and wherein displacing the piston in the second direction to decrease the pressure occurs with the outlet valve of the wheel brake with the highest wheel desired pressure in the fully closed position, and the cylinder-piston arrangement draws pressure fluid from the wheel brake having the highest wheel desired pressure into the hydraulic pressure chamber.

2. The method as claimed in claim 1, wherein during the antilock braking control operation the predetermined pressure ($P_{Pre\_Pressure}$) in the hydraulic pressure chamber corresponds to the highest desired pressure of the wheel brakes.

3. The method as claimed in claim 1 wherein during the antilock braking control operation at least one of the plurality of wheel brakes having the highest wheel desired pressure in terms of a full pressure compensation between the wheel brake and the pressure chamber is always connected to the hydraulic pressure chamber.

4. The method as claimed in claim 1 wherein during the antilock braking control operation the inlet valve of the wheel brakes having the highest wheel desired pressure is open.

5. The method as claimed in claim 1 wherein during the antilock braking control operation the inlet valves of all the plurality of wheel brakes are open and the wheel desired pressures of each of the plurality of wheel brakes correspond to the highest wheel desired pressure or correspond approximately to the highest wheel desired pressure.

6. The method as claimed in claim 1 further comprising pressure increase procedures or pressure reduction procedures that are to be performed on the wheel brake having the highest wheel desired pressure or on a wheel brake having a wheel desired pressure that is almost the highest wheel desired pressure is performed exclusively by means of displacing the piston of the cylinder-piston arrangement as long as the wheel desired pressure of the wheel brake is the highest desired pressure.

7. The method as claimed in claim 1 wherein each of the plurality of wheel brakes whose desired pressure does not correspond to the highest wheel desired pressure is separated by the inlet valve in a closed state from the hydraulic pressure chamber.

8. The method as claimed in claim 7, wherein the inlet valve of the wheel brake whose wheel desired pressure does not correspond to the highest wheel desired pressure is opened for a short period of time in the case that a pressure increase procedure is to be performed at the wheel brake, and that the outlet valve of the wheel brake whose wheel desired pressure does not correspond to the highest wheel desired pressure is opened in the case that a pressure reduction procedure is to be performed at the wheel brake.

9. The method as claimed in claim 1 wherein the wheel desired pressure ($P_{Request\_i}$) for one of the plurality of wheel brakes is equal to an ABS pressure request ($P_{ABS\_act\_i}$) that is determined by means of the antilock braking control function if the ABS pressure request ($P_{ABS\_act\_i}$) is less than a braking pressure that is requested by a vehicle driver ($P_{Request\_Driver}$).

10. The method as claimed in claim 9, wherein the wheel desired pressure ($P_{Request\_i}$) for a wheel brake (i) is equal to the braking pressure that is requested by the vehicle driver ($P_{Request\_Driver}$) if the braking pressure requested by the vehicle driver ($P_{Request\_Driver}$) is less than the ABS pressure request ($P_{ABS\_act\_i}$).

11. The method as claimed in claim 9 wherein the ABS pressure request ($P_{ABS\_act\_i}$) that is determined by means of the antilock braking control function is equal to a predetermined maximum pressure value ($P_{Max}$) if the wheel brake is not undergoing an antilock control operation or if the antilock braking control operation at the wheel brake does not have priority.

12. The method as claimed in claim 1 wherein the inlet valve is embodied as an analog inlet valve or as inlet valve that operates in an analog manner.

13. The method as claimed in claim 12, wherein a pressure increase procedure is performed in a wheel brake whose wheel desired pressure does not correspond to the highest wheel desired pressure by means of digitally controlling the associated inlet valve if the pressure differential between the predetermined_pressure ($P_{Pre\_Pressure}$) in the hydraulic pressure chamber and the current wheel braking pressure is less than a predetermined threshold value.

14. The method of claim 1, wherein the pressure in the hydraulic pressure chamber corresponds to the pressure in the wheel brake having the highest wheel desired pressure throughout the exclusive control by the cylinder-piston arrangement.

15. An electrohydraulic braking system for motor vehicles of a type having at least one antilock braking control function, having a pressure generating device that can be controlled by means of an electronic control unit, which pressure generating device includes a cylinder-piston arrangement having at least one hydraulic pressure chamber, and a piston which can be actuated by means of an electromechanical actuator, so that a predetermined pressure ($P_{Pre\_Pressure}$) can be set in the hydraulic pressure chamber, and having a plurality of hydraulically actuatable wheel brakes that are connected by means of an electrically actuatable inlet valve to the hydraulic pressure chamber and that are connected or can be connected in each case by means of an electrically actuatable outlet valve to a pressure medium storage container, comprising the electronic control unit is adapted for performing the steps of, in the case for all the wheel brakes being subjected to an antilock braking control operation, controlling the cylinder-piston arrangement for setting an individual wheel desired pressure ($P_{Request\_i}$) for each wheel brake, wherein the individual wheel desired pressures for each of the wheel brakes comprises a highest wheel desired pressure and at least one reduced wheel desire pressure, wherein the individual wheel desired pressures for each of the wheel brakes is set in such a manner that the predetermined pressure ($P_{Pre\_Pressure}$) in the hydraulic pressure chamber is set to the highest wheel desired pressure ($P_{Request\_i}$) of the wheel brakes, wherein at least one of the wheel brakes has a desired pressure corresponding to the highest wheel desired pressure and the pressure in the wheel brake having the highest wheel desired pressure is set by fully opening the corresponding inlet valve and fully closing the corresponding outlet valve and by controlling the cylinder-piston arrangement such that the pressure in the wheel brake having the highest wheel desired pressure is exclusively controlled by the cylinder-piston arrangement, wherein the pressure in at least one of the wheel brakes having the reduced wheel desired pressure is set by actuating the corresponding inlet valve and outlet valve to reduce the corresponding pressure;

wherein the pressure in the wheel brake having the highest wheel desired pressure is exclusively controlled by the cylinder-piston arrangement by displacing the piston in a first direction to increase the pressure in the wheel brake having the highest wheel desired pressure and displacing the piston in a second direction opposite the first direction to decrease the pressure in the wheel brake having the highest wheel desired pressure; and wherein displacing the piston in the second direction to decrease the pressure occurs with the outlet valve of the wheel brake with the highest wheel desired pressure in the fully closed position, and the cylinder-piston arrangement draws pressure fluid from the wheel brake having the highest wheel desired pressure into the hydraulic pressure chamber.

* * * * *